United States Patent
Richenstev et al.

(10) Patent No.: US 8,261,873 B2
(45) Date of Patent: Sep. 11, 2012

(54) ELECTROMAGNETIC LINEAR DRIVE SOURCE FOR LOGGING-WHILE-DRILLING/WIRELINE ACOUSTIC APPLICATIONS

(75) Inventors: Valeriy Richenstev, Houston, TX (US); Vladimir Dubinsky, Houston, TX (US); Douglas J. Patterson, Spring, TX (US); Jonathan F. Hook, Houston, TX (US); David H. Lilly, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 18 days.

(21) Appl. No.: 12/330,340

(22) Filed: Dec. 8, 2008

(65) Prior Publication Data
US 2010/0142319 A1 Jun. 10, 2010

(51) Int. Cl.
*G01V 1/40* (2006.01)
(52) U.S. Cl. ........ 181/104; 181/166; 181/167; 181/106; 381/400
(58) Field of Classification Search .......... 181/166, 181/167, 171, 172, 104, 106, 113; 381/400
See application file for complete search history.

(56) References Cited

U.S. PATENT DOCUMENTS

| | | | | |
|---|---|---|---|---|
| 3,200,901 | A | * | 8/1965 | Basseches .................. 181/163 |
| 3,382,841 | A | * | 5/1968 | Bouyoucos .............. 116/137 A |
| 4,862,991 | A | * | 9/1989 | Hoyle et al. ................. 181/106 |
| 4,991,685 | A | * | 2/1991 | Airhart ........................ 181/106 |
| 6,219,432 | B1 | * | 4/2001 | Fryer et al. .................. 381/398 |
| 7,377,338 | B2 | * | 5/2008 | Bassinger ................... 175/296 |
| 7,578,359 | B2 | * | 8/2009 | Coates et al. .................. 175/40 |
| 2008/0205687 | A1 | | 8/2008 | Vincent et al. |
| 2009/0073806 | A1 | * | 3/2009 | Mandal ........................ 367/35 |
| 2009/0213690 | A1 | * | 8/2009 | Steinsiek et al. .............. 367/35 |

\* cited by examiner

*Primary Examiner* — Forrest M Phillips
(74) *Attorney, Agent, or Firm* — Mossman Kumar & Tyler PC

(57) ABSTRACT

An apparatus and method for providing a downhole acoustic source is disclosed. The acoustic source includes a piston configured to oscillate in an axial direction of the acoustic source and produce an acoustic signal in a medium in contact with an exterior surface of the piston, and an elastomer disposed on an interior side of the piston, an acoustic impedance of the elastomer selected to match an acoustic impedance of the piston. A permanent magnet is configured to provide a permanent magnetic field oriented in the axial direction, and a coil disposed on an interior side of the piston produces an alternating magnetic field in the region of the permanent magnetic field. The elastomer may be, for example, a silicon rubber, a silicone jelly, and a silicone oil. A plurality of acoustic sources may be arranged to produce an acoustic dipole configuration or an acoustic quadrupole configuration.

20 Claims, 5 Drawing Sheets

ELECTROMAGNETIC LINEAR DRIVE SOURCE FOR LOGGING-WHILE-DRILLING/WIRELINE ACOUSTIC APPLICATIONS

BACKGROUND OF THE DISCLOSURE

1. Field of the Disclosure

The present disclosure relates in general to the field of acoustic testing in a downhole environment and provides an acoustic source suitable for use in acoustic tests in a wireline or logging-while-drilling device.

2. Description of the Related Art

In petroleum exploration, acoustic testing is often used to obtain information about formations surrounding a borehole. Typically, one or more acoustic sources are generally conveyed downhole on a wireline or logging-while-drilling (LWD) device, for example. The one or more acoustic sources are activated from a downhole location to produce one or more acoustic pulses. An acoustic response of the surrounding formation to the one or more acoustic pulses are then recorded and analyzed. Typically downhole testing requires an acoustic source that has an operating acoustic range that extends from several hundred Hertz (Hz) at a low frequency end to a few kHz at a high frequency end.

Numerous borehole acoustic testing applications typically require a compact, efficient, low-frequency acoustic source. Electrical power is generally limited for downhole tools in logging-while-drilling (LWD) measurements. Thus electrical efficiency of electro-acoustic conversion of acoustic tools is generally desired. Also, the radial depth that is available for mounting individual source elements on such a downhole conveying device is typically limited due to requirements for overall strength of the drill collar in the face of local stresses. Complex configurations, such as an acoustic quadrupole configuration in which four acoustic sources are required at the same general axial location, further limit on the amount of available radial depth. Additionally, LWD quadrupole measurements use a certain bandwidth of a generated low frequency acoustic signal. Thus, a selected frequency region is desired from the downhole acoustic source.

Various materials are currently being used in acoustic sources used downhole. One of the most commonly used materials is piezoceramics. Piezoceramic acoustic sources provide good performance for high frequency applications (i.e., in a range of several kHz to a few hundred kHz). However, these sources tend to lack efficiency at lower frequencies. Alternatively, other acoustic sources use magnetostrictive materials. In contrast to piezoceramic acoustic sources, magnetostrictive sources provide efficiency at low frequencies (around 1 kHz). However, these sources generally require a fairly long active element or force direction converter in order to provide an adequate force/displacement at an active acoustic radiator (i.e., piston or membrane). The size of the active element/force direction converter is problematic when attempting to fit the source into an available space within a drill collar. Also, configurations of multiple acoustic sources facing in different azimuthal directions, i.e. quadruple configurations, are especially sensitive to alignment. The presence of a converter typically makes alignment difficult.

Therefore, there is a need for an electromagnetic linear acoustic source that can provide acoustic pulses over a suitable acoustic frequency range and operate from a device downhole, such as a LWD or wireline system.

SUMMARY OF THE DISCLOSURE

The present disclosure provides a downhole acoustic source, which includes: a piston configured to oscillate in an axial direction of the acoustic source and produce an acoustic signal in a medium in contact with an exterior surface of the piston, and an elastomer disposed on an interior side of the piston, an acoustic impedance of the elastomer selected to match an acoustic impedance of the piston. A stator is disposed on a side of the elastomer opposite the piston and is configured to house the piston. A permanent magnet is configured to provide a permanent magnetic field oriented in the axial direction of the acoustic source. A coil coupled to the piston produces an alternating magnetic field in the region of the permanent magnetic field. The alternating magnetic field may be produced using an alternating current source in electrical contact with the coil. The elastomer may be one of: i) a silicon rubber, ii) a silicone jelly, and iii) a silicone oil. The source may be conveyed into a wellbore using one of: i) a wireline, and ii) a drillstring. A plurality of acoustic sources may be arranged to produce at least one of: i) an acoustic dipole configuration, and ii) an acoustic quadrupole configuration. The acoustic source may be configured on a tool so as to reduce an acoustic tool mode.

In another aspect, the present disclosure provides a method of providing an acoustic source, comprising: oscillating a piston in an axial direction of the acoustic source to produce an acoustic signal in a medium in contact with an exterior surface of the piston; and matching an acoustic impedance of an elastomer disposed on an interior side of the piston to an acoustic impedance of the piston. The method includes disposing a stator on a side of the elastomer opposite the piston. The method further includes providing a permanent magnetic field oriented in the axial direction and producing an alternating magnetic field in a region of the permanent magnetic field to oscillate the piston. An alternating current may be used to produce the alternating magnetic field in the coil. The elastomer may be one of: i) a silicon rubber, ii) a silicone jelly, and iii) a silicone oil. The acoustic source may be conveyed downhole using one of: i) a wireline, and ii) a drillstring. In one aspect, a plurality of sources may be used to produce at least one of: i) a dipole configuration, and ii) a quadrupole configuration. The method further comprises orienting the acoustic source on a tool to reduce an acoustic tool mode.

BRIEF DESCRIPTION OF THE DRAWINGS

For detailed understanding of the present disclosure, reference is made to the following detailed description of an exemplary embodiment, taken in conjunction with the accompanying drawings, in which like elements have been given like numerals, and in which.

DETAILED DESCRIPTION OF THE DISCLOSURE

Figure 1A:
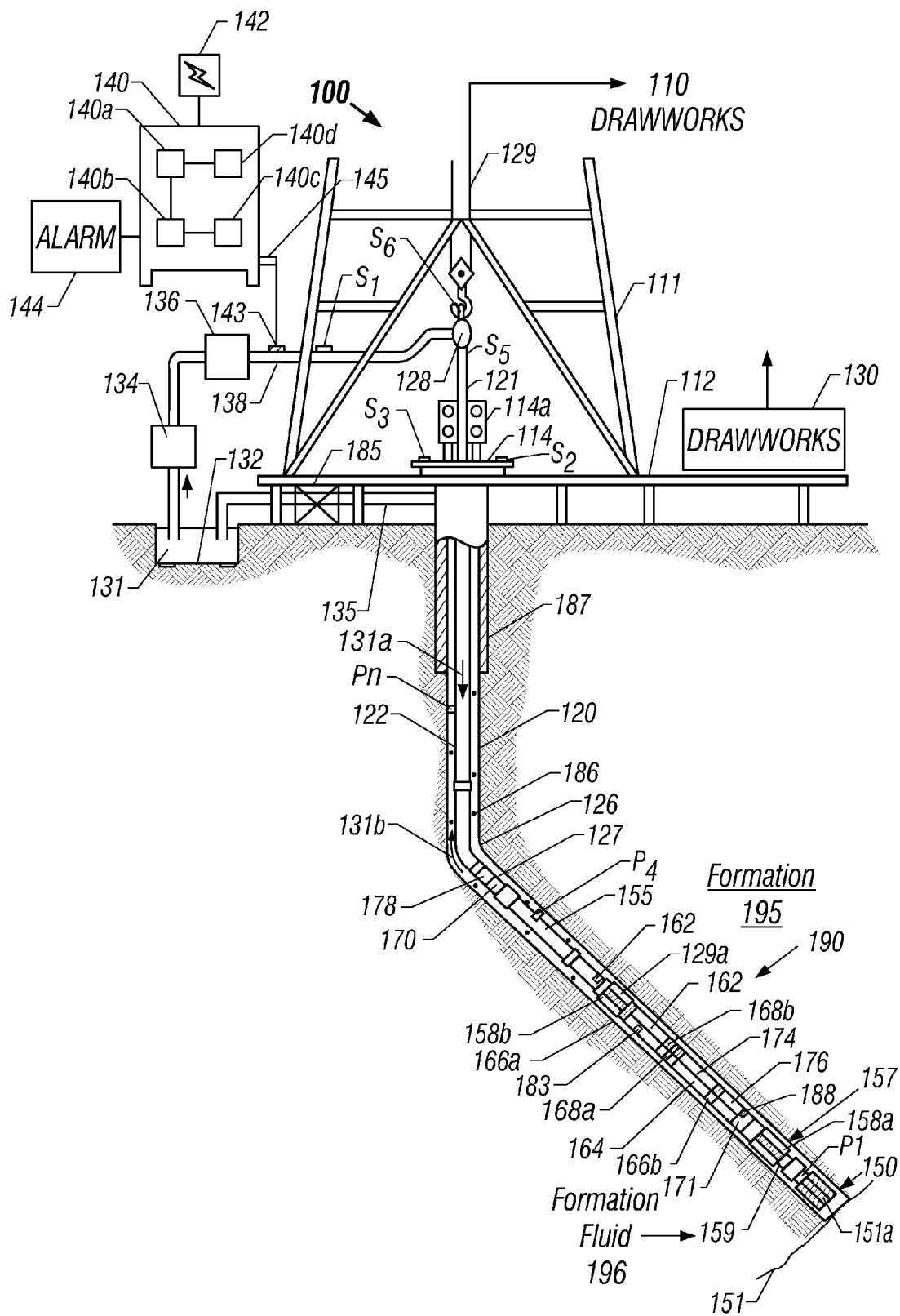
FIG. 1A shows a schematic diagram of a drilling system having a bottom hole assembly (BHA) or drilling assembly that includes sensors for downhole borehole condition and location measurements.

FIG. 1 shows a schematic diagram of a drilling system 110 having a bottom hole assembly (BHA) or drilling assembly 190 that includes sensors for downhole borehole condition and location measurements. The BHA 190 is conveyed in a borehole 126. The drilling system 110 includes a conventional derrick 111 erected on a floor 112 which supports a rotary table 114 that is rotated by a prime mover such as an electric motor (not shown) at a desired rotational speed. The drill string 120 includes a tubing (drill pipe or coiled-tubing) 122 extending downward from the surface into the borehole 126. A drill bit 150, attached to the drill string 120 end, disintegrates the geological formations when it is rotated to drill the borehole 126. The drill string 120 is coupled to a drawworks 130 via a kelly joint 121, swivel 128 and line 129 through a pulley (not shown). Drawworks 130 is operated to control the weight on bit ("WOB"), which is an important parameter that affects the rate of penetration ("ROP"). A tubing injector 114a and a reel (not shown) are used instead of the rotary table 114 to inject the BHA into the wellbore when a coiled-tubing is used as the conveying member 122. The operations of the drawworks 130 and the tubing injector 114a are known in the art and are thus not described in detail herein.

During drilling, a suitable drilling fluid 131 from a mud pit (source) 132 is circulated under pressure through the drill string 120 by a mud pump 134. The drilling fluid passes from the mud pump 134 into the drill string 120 via a desurger 136 and the fluid line 138. The drilling fluid 131 discharges at the borehole bottom 151 through openings in the drill bit 150. The drilling fluid 131 circulates uphole through the annular space 127 between the drill string 120 and the borehole 126 and returns to the mud pit 132 via a return line 135 and drill-cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications only rotating the drill pipe 122 rotates the drill bit 150. However, in many other applications, a downhole motor 155 (mud motor) is disposed in the drilling assembly 190 to rotate the drill bit 150, and the drill pipe 122 is rotated usually to supplement the rotational power, if required, and to effect changes in the drilling direction. In either case, the ROP for a given BHA largely depends on the WOB or the thrust force on the drill bit 150 and its rotational speed.

The mud motor 155 is coupled to the drill bit 150 via a drive disposed in a bearing assembly 157. The mud motor 155 rotates the drill bit 150 when the drilling fluid 131 passes through the mud motor 155 under pressure. The bearing assembly 157 supports the radial and axial forces of the drill bit 150, the downthrust of the mud motor 155 and the reactive upward loading from the applied weight on bit. A lower stabilizer 158a coupled to the bearing assembly 157 acts as a centralizer for the lowermost portion of the drill string 120.

The system 100 may further include a surface control unit 140 configured to provide information relating to the drilling operations and for controlling certain desired drilling operations. In one aspect the surface control unit 140 may be a computer-based system that includes one or more processors (such as microprocessors) 140a, one or more data storage devices (such as solid state-memory, hard drives, tape drives, etc.) 140b, display units and other interface circuitry 140c. Computer programs and models 140d for use by the processors 140a in the control unit 140 are stored in a suitable data storage device 140b, including, but not limited to: a solid-state memory, hard disc and tape. The surface control unit 140 also may interact with one or more remote control units 142 via any suitable data communication link 141, such as the Ethernet and the Internet. In one aspect signals from the downhole sensors and devices 143 (described later) are received by the control unit 149 via a communication link, such as fluid, electrical conductors, fiber optic links, wireless links, etc. The surface control unit 140 processes the received data and signals according to programs and models 140d provided to the control unit and provides information about drilling parameters such as WOB, RPM, fluid flow rate, hook load, etc. and formation parameters such as resistivity, acoustic properties, porosity, permeability, etc. The surface control unit 140 records such information. This information, alone or along with information from other sources, may be utilized by the control unit 140 and/or a drilling operator at the surface to control one or more aspects of the drilling system 100, including drilling the wellbore along a desired profile (also referred to as "geosteering").

The surface control unit or processor 140 receives signals from the downhole sensors and devices via a sensor 143 placed in the fluid line 138 and signals from sensors $S_1$-$S_6$ and other sensors used in the system 110 and processes such signals according to programmed instructions provided to the surface control unit 140. The surface control unit 140 displays desired drilling parameters and other information on a display/monitor 142 that is utilized by an operator to control the drilling operations. The surface control unit 140 contains a computer, memory for storing data, recorder for recording data and other peripherals. The surface control unit 140 also includes a simulation model and processes data according to programmed instructions. The control unit 140 is preferably adapted to activate alarms 144 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 190. As an example, FIG. 1A shows an exemplary resistivity-measuring device 164 in BHA 190. It provides signals from which resistivity of the formation near or in front of the drill bit 150 is determined. The resistivity device 164 has transmitting antennae 166a and 166b spaced from the receiving antennae 168a and 168b. In operation, the transmitted electromagnetic waves are perturbed as they propagate through the formation surrounding the resistivity device 164. The receiving antennae 168a and 168b detect the perturbed waves. Formation resistivity is derived from the phase and amplitude of the detected signals. The detected signals are processed by a downhole computer 170 to determine the resistivity and dielectric values.

An inclinometer 174 and a gamma ray device 176 are suitably placed along the resistivity-measuring device 164 for respectively determining the inclination of the portion of the drill string near the drill bit 150 and the formation gamma ray intensity. Any suitable inclinometer and gamma ray device, however, may be utilized for the purposes of this invention. In addition, position sensors, such as accelerometers, magnetometers or gyroscopic devices may be disposed in the BHA to determine the drill string azimuth, true coordinates and direction in the wellbore 126. Such devices are known in the art and are not described in detail herein.

In the above-described configuration, the mud motor 155 transfers power to the drill bit 150 via one or more hollow shafts that run through the resistivity-measuring device 164. The hollow shaft enables the drilling fluid to pass from the mud motor 155 to the drill bit 150. In an alternate embodiment of the drill string 120, the mud motor 155 may be coupled below resistivity measuring device 164 or at any other suitable place. The above described resistivity device, gamma ray device and the inclinometer are preferably placed in a common housing that may be coupled to the motor. The devices for measuring formation porosity, permeability and density (collectively designated by numeral 178) are preferably placed above the mud motor 155. Such devices are known in the art and are thus not described in any detail.

As noted earlier, a significant portion of the current drilling systems, especially for drilling highly deviated and horizontal wellbores, utilize coiled-tubing for conveying the drilling assembly downhole. In such application a thruster 171 is deployed in the drill string 190 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized, a rotary table does not rotate the tubing; instead it is injected into the wellbore by a suitable injector 114a while the downhole motor 155 rotates the drill bit 150.

Figure 1B:
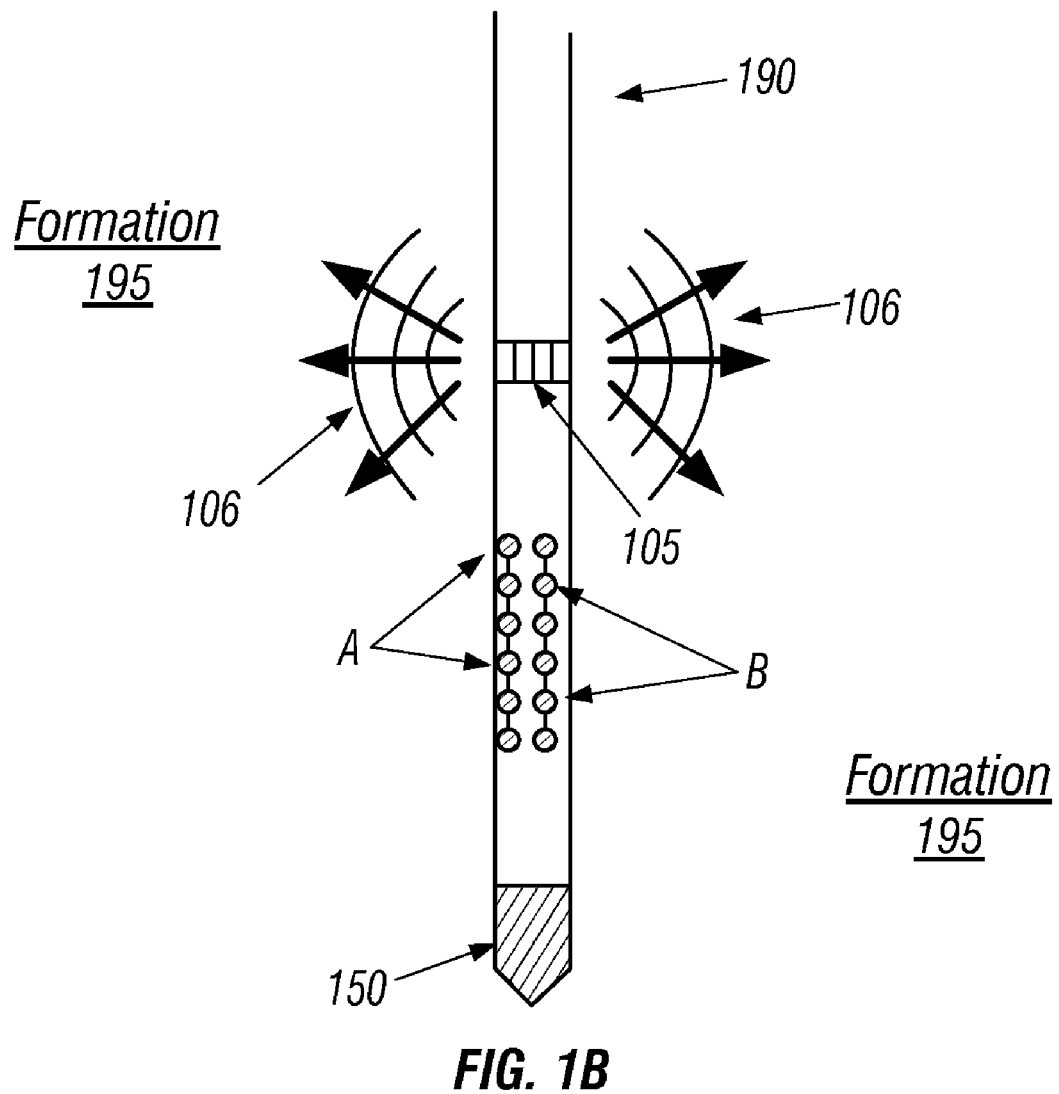
FIG. 1B is a schematic view of an acoustic logging-while-drilling (LWD) tool system on a BHA drill collar containing a drill bit.

FIG. 1B is a schematic view of an acoustic logging-while-drilling (LWD) tool system on a BHA drill collar 190 containing a drill bit 150. This system is mounted on the BHA drill collar 190 for performing acoustic measurements while the formation is being drilled. The acoustic logging while drilling tool system has a source 105 to emit acoustic vibrations 106 that may traverse formation 195 and may also be propagated along the borehole wall and be received by sensors A and B which may be in arrays.

Figure 2:
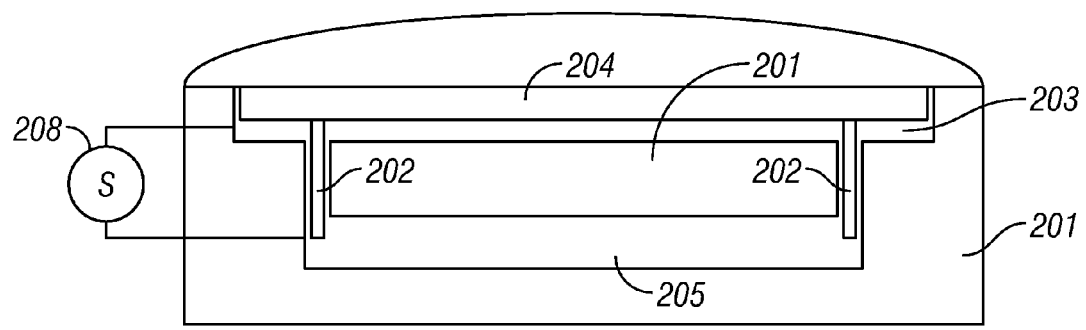
FIG. 2 shows a cross-sectional view of an exemplary acoustic source in one aspect of the present disclosure.

FIG. 2 shows a cross-sectional view of an exemplary acoustic source 200 in one aspect of the present disclosure. The exemplary acoustic source includes a stator 201 and a piston 204 that is in linear oscillatory motion along an axial direction of the acoustic source. In the exemplary embodiment, the axial direction is a longitudinal axis of the acoustic source. In the illustration, the upper surface of the piston 204 defines the exterior of the source 200 and would typically be in contact with borehole fluid. Typically, this direction is transverse to a longitudinal axis of the logging tool. A magnet 205 which may be a permanent magnet may be mounted on the stator 201. In one embodiment, the magnet is located in a central portion of the stator between the stator 201 and the piston 204. The magnet is oriented to provide a magnetic field oriented substantially parallel to the axial direction of the acoustic source 200. Coil 202 is mounted to the piston. When activated, coil 202 induces an alternating magnetic field that interacts with the permanent magnetic field of the magnet 205. The interaction of the alternating magnetic field and the permanent magnetic field produces an oscillatory motion of the coil and of the piston with respect to the stator along the axial direction of the acoustic source. In a particular embodiment, the coil defines a circular area substantially perpendicular to the field of the permanent magnet. The coil oscillates within a groove of the stator that accommodates the coil. Current source 208 in electrical contact with coil 202 provides an alternating current through the coil to induce the alternating magnetic field. The alternating current may be sinusoidal, a square wave, a wavelet, etc. An elastomer 203 is disposed on a side of piston 204 away from the exterior of the acoustic source, i.e., on an interior side of the piston, and is selected to fit various specifications of the acoustic source. Various parameters, such as frequency, phase and displacement of the acoustic source may thereby be controlled. The stator 201 may further be disposed next to the elastomer at a side of the elastomer opposite the piston 204.

Figure 3:
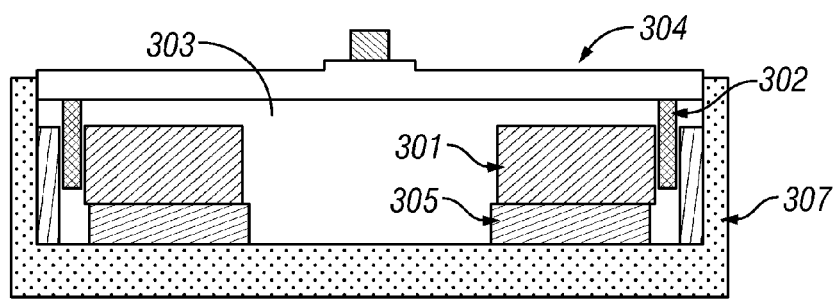
FIG. 3 shows a cross-sectional view of an alternate embodiment of an acoustic source of the present disclosure.

FIG. 3 shows a cross-sectional view of an alternate embodiment of an acoustic source of the present disclosure. The alternative acoustic source includes a casing 307 containing a stator 301. The casing may be made of magneto-conductive material. Magnet 305 is mounted between the casing 307 and the stator 301. The magnet 305 is oriented to provide a magnetic field oriented substantially along an axial direction of the stator/casing. Piston 304 is in linear oscillatory motion along the axial direction. Coil 302 is mounted to the piston. When activated, coil 302 induces an alternating magnetic field that interacts with the permanent magnetic field of the magnet 305. The interaction of the alternating magnetic field and the permanent magnetic field produces an oscillatory motion of the coil/piston with respect to the stator along the axial direction. Current source (not shown) provides an alternating current to coil 302 to induce the alternating magnetic field. An elastomer 303 is disposed on a side of piston 304 away from the exterior of the source. The elastomer may be selected for optimal performance of the acoustic source. The stator 301 may further be disposed next to the elastomer at a side of the elastomer opposite the piston 304.

Components of the acoustic source are typically designed taking into consideration parameters related to the downhole environment and the downhole conveyance device. Acoustic source parameters and load parameters of the outer medium are generally considered together in designing the acoustic source. Exemplary design parameters include: external dimensions of the source, depth of the source, coil diameter and height, coil wire diameter, method of mounting the coil to the piston, placement of coil with respect to the piston, piston strength and flexibility, piston weight, piston diameter, oil backing effect on the source, outside liquid effect on the source and acoustic power, magnetic materials of the stator, working gap shape (between stator and piston), control voltage form, power losses in the source and the control system. The form of the electric signal that drives the source may be selected to optimize the efficiency of the source in tandem with acoustic and/or electric feedback. Also, piston 204 is generally designed to avoid destructive acoustic oscillations/interference.

An acoustic source operates in either resonant or non-resonant modes. Backing elastomeric material may be selected to have properties for tuning of the resonance frequencies and acoustic performance of the acoustic source. Frequency, phase and displacement may be controlled independently from each other. The amplitude of the displacement of the piston is affected by the load. However, frequency and, in most cases, the phase of an acoustic excitation are not affected.

The acoustic source of the present disclosure may have a variety of geometries and shapes. A top view of an acoustic source may be circular, square, rectangular, conical, have a hole inside the source, etc. The ratio of diameter to length of the source may vary over a wide range. For example, a 10 kW 100 Hz source may have a diameter to length ratio that varies, for example, between 10/1 and 1/10. Due to flexibility in the mechanical design/geometry, an acoustic source may thus be flexibly designed to fit into a drill collar without compromising the collar strength or collar size, while maintaining acoustic source efficiency.

The characteristics of the gap between piston and stator are significant to the performance of the acoustic source. Those versed in the art and having benefit of the present disclosure would recognize that if the acoustic impedance of the elastomer is either zero or very high, there would be an almost complete reflection of acoustic waves traveling through the piston at the piston-elastomer interface. Such a complete reflection would result in undesirable reverberations. In general, an elastomer is selected to occupy the gap that has characteristics of high compressibility, enabling compressibility and responsiveness of the gap to the acoustic pulse. The elastomer is typically selected to have an acoustic impedance that matches an acoustic impedance of the piston. In one aspect, the elastomer may be selected to improve an acoustic output of the source. In one aspect, the elastomer is selected to provide low sound loss. In another aspect, the elastomer is selected to provide low sound velocity i.e. 200-300 m/sec. The elastomer may have an acoustic response selected to tune the acoustic source to a desired resonant frequency. Suitable elastomers for the present disclosure include, for example, silicone oil, a silicone rubber, a silicone jelly or other material suitable for downhole applications.

Figure 4:
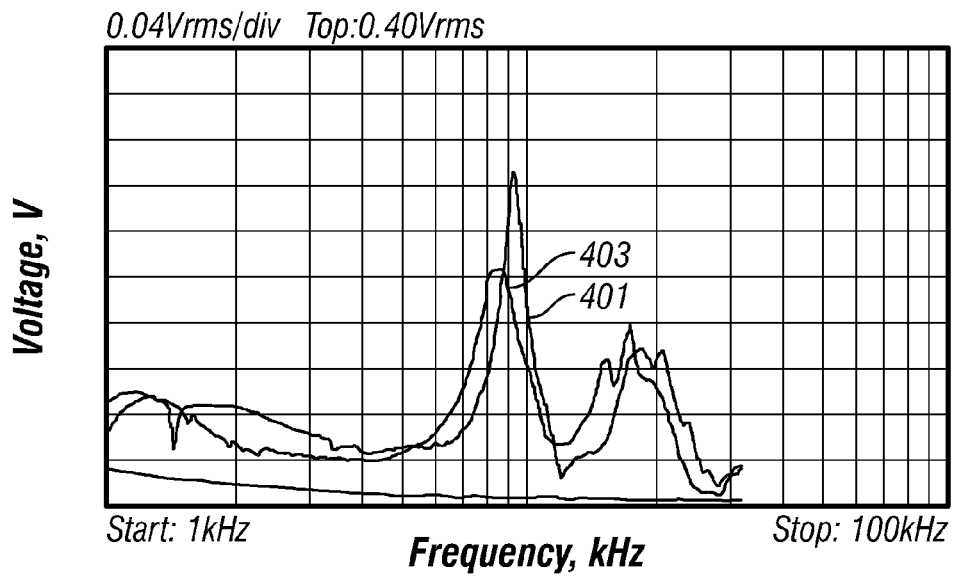
FIG. 4 shows frequency responses of an exemplary acoustic source of the present disclosure.

FIG. 4 shows frequency responses of an exemplary acoustic source of the present disclosure. The exemplary device is tested over a frequency range from 1 kHz to 100 kHz. Frequency is shown along the x-axis in kHz, and acoustic response of the source is shown along the y-axis in Volts. The source is operated in both an air environment and a water environment, and response curves are shown for both the operation in air 401 and the operation in water 403. Sine wave and low power firing is applied to minimize harmonics. The amplitude of the applied sine voltage is held constant. A peak for both response curves occurs at approximately 9 kHz.

Figure 5:
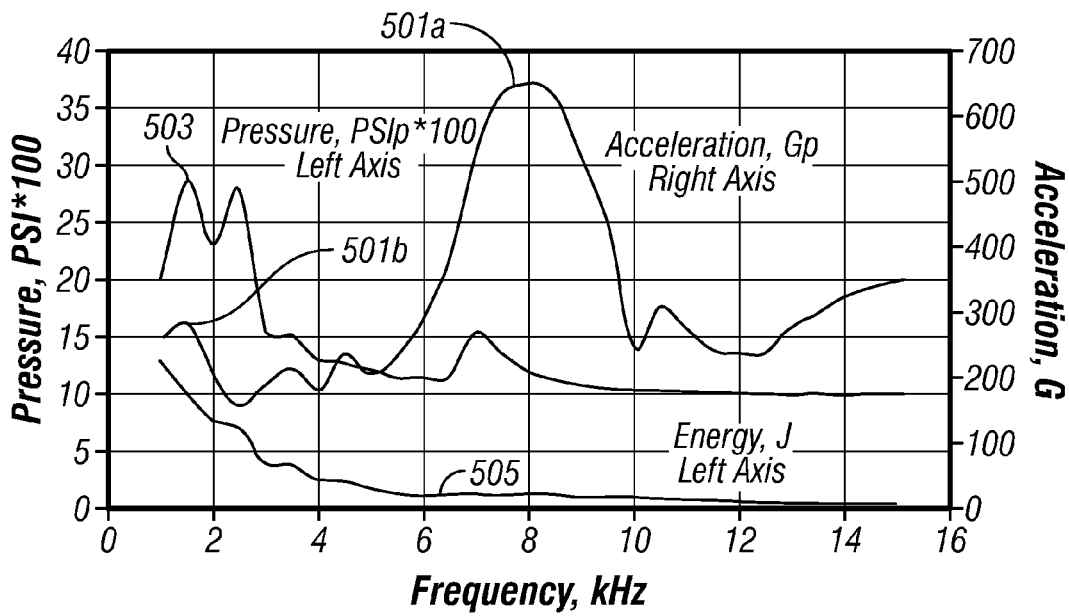
FIG. 5 shows various parameter responses over a frequency range for a source activated in water.

FIG. 5 shows various parameter responses over a frequency range for a source activated in water. The source was tested over a frequency range of 1 kHz to 15 kHz at ½ kHz frequency intervals using 5 square wave bursts at each frequency. FIG. 5 shows an acceleration curve 501, a pressure curve 503 and an energy curve 505. Frequency is shown along the x-axis in kHz. The left axis shows the values of the pressure curve 503 in 100*Psi. The right axis shows the values of the acceleration curve in G's. A peak of the acceleration curve is shown at 8 kHz (501A) and another smaller peak is seen around 2 kHz (501B). Therefore the acoustic source of FIG. 5 may also be useful for testing in low frequency ranges.

Figure 6:
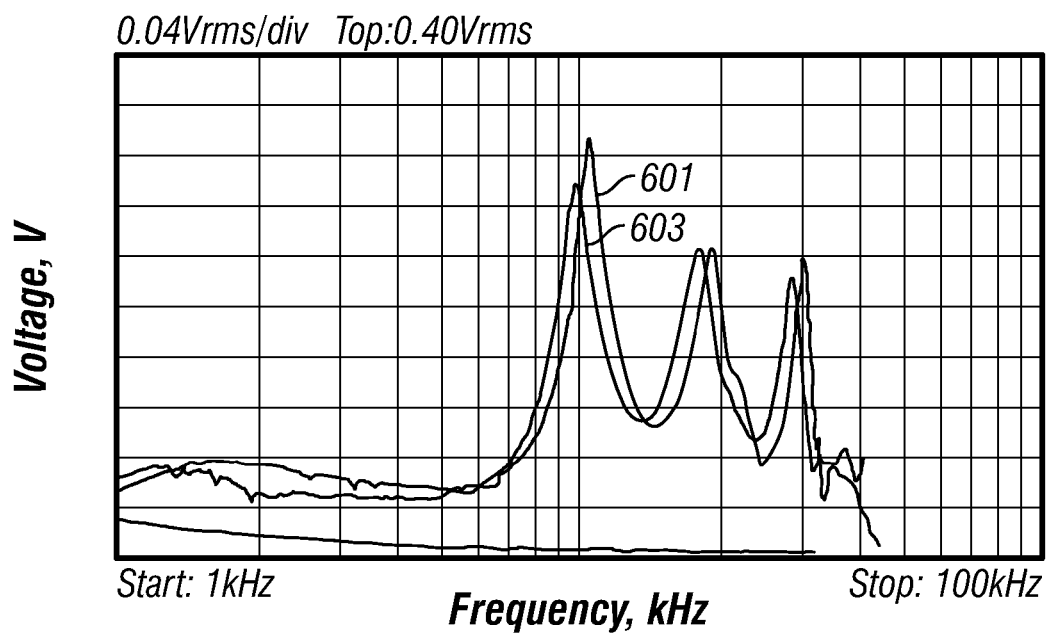
FIG. 6 shows a set of response curves obtained over a range of frequencies.

FIG. 6 shows a set of response curves obtained over a range of frequencies. Frequency is shown along the x-axis in kHz, and acoustic response of the source is shown along the y-axis in Volts. The source is operated in both an air environment and a water environment. Sine wave and low power firing is applied to minimize harmonics. The amplitude of the applied sine voltage is held constant. Response curve 601 in air is obtained and a response curve 603 in water is obtained over frequencies ranging from 1 kHz to 100 kHz. Substantial agreement is seen between the response curves in both mediums.

Figure 7:
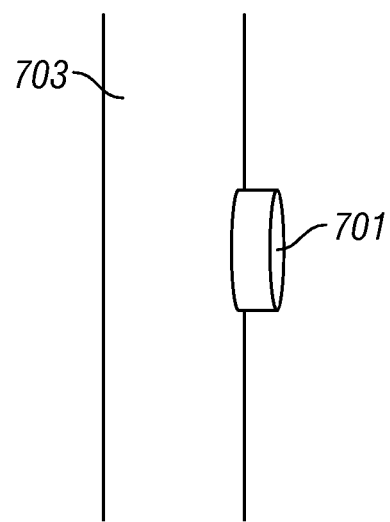
FIG. 7 shows an exemplary configuration of an acoustic source of the present disclosure on a tool for reducing an axial tool mode.

FIG. 7 shows an exemplary configuration of an acoustic source 701 of the present disclosure on a tool 703 for reducing an axial tool mode. In one aspect, the acoustic source has a short axial length, i.e. is short in the direction of motion of the source's piston. Due to the short axial length, the source is suitable to be oriented on the tool assembly to provide an acoustic wave in a substantially radial direction. A typical tool mode comprises an axially propagating wave. A configuration in which the acoustic source is oriented orthogonal to the tool axis reduces tool mode vibrations. Also, due to the short axial length of the source, tool mode acoustic signals may be reduced or prevented from being strongly injected into the axis of the tool. Additional decoupling of the acoustic source from the tool may be performed. In one instance, a rubberizing material may be placed between the acoustic source and the tool to further reducing the tool mode. Reduction of the tool mode consequently reduces noise in acquired signals such as may be measured from a surrounding formation.

Although the present disclosure is discussed with reference to LWD testing, the acoustic source may be used in various applications, including wireline testing, wireline/LWD acoustics, acoustic ranging, acoustic geosteering, etc. A primary focus of acoustic testing includes LWD quadrupole acoustic measurements. The acoustic source can be used in a variety of configurations, include dipole and quadrupole configurations.

While the foregoing disclosure is directed to the exemplary embodiments of the disclosure, various modifications will be apparent to those skilled in the art. It is intended that all variations within the scope and spirit of the appended claims be embraced by the foregoing disclosure.

What is claimed is:

1. A downhole acoustic source, comprising:
   a piston configured to oscillate in an axial direction of the acoustic source and produce an acoustic signal in a fluid in an annulus in contact with an exterior surface of the piston, the exterior surface of the piston extending into the annulus, and the axial direction of the acoustic source being transverse to an axial direction of the tool; and
   an elastomer disposed on an interior side of the piston, an acoustic impedance of the elastomer selected to match an acoustic impedance of the piston.

2. The downhole acoustic source of claim 1 further comprising a stator disposed on a side of the elastomer opposite the piston, the stator configured to house the piston.

3. The downhole acoustic source of claim 1 further comprising a permanent magnet configured to provide a permanent magnetic field oriented in an axial direction of the acoustic source.

4. The downhole acoustic source of claim 3 further comprising a coil coupled to the piston and configured to produce an alternating magnetic field in the region of the permanent magnetic field.

5. The downhole acoustic source of claim 4 further comprising an alternating current source in electrical contact with the coil to produce the alternating magnetic field.

6. The downhole acoustic source of claim 1, wherein the elastomer is one of: i) a silicon rubber, ii) a silicone jelly, and iii) a silicone oil.

7. The downhole acoustic source of claim 1, wherein the source is configured to be conveyed on one of: i) a wireline, and ii) a drillstring.

8. The downhole acoustic source of claim 1, wherein the source is configured as part of: at least one of: i) an acoustic dipole configuration, and ii) an acoustic quadrupole configuration.

9. The downhole acoustic source of claim 1, wherein the source is configured to reduce an acoustic tool mode.

10. The downhole acoustic source of claim 1, wherein the acoustic source is configured to be coupled to a surface of a bottom hole assembly.

11. A method of providing an acoustic source, comprising:
oscillating a piston in an axial direction of the acoustic source to produce an acoustic signal in a fluid in an annulus in contact with an exterior surface of the piston, the exterior surface of the piston extending into the annulus, and the axial direction of the acoustic source being transverse to an axial direction of the tool; and
matching an acoustic impedance of an elastomer disposed on an interior side of the piston to an acoustic impedance of the piston.

12. The method of claim 11 further comprising a disposing a stator on a side of the elastomer opposite the piston.

13. The method of claim 11 further comprising providing a permanent magnetic field oriented in the axial direction of the acoustic source.

14. The method of claim 13 further comprising producing an alternating magnetic field in a region of the permanent magnetic field to oscillate the piston.

15. The method of claim 14 further comprising providing an alternating current to produce the alternating magnetic field in the coil.

16. The method of claim 11, wherein the elastomer is one of: i) a silicon rubber, ii) a silicone jelly, and iii) a silicone oil.

17. The method of claim 11 further comprising conveying the acoustic source downhole on one of: i) a wireline, and ii) a drillstring.

18. The method of claim 11 further comprising using the source as part of at least one of: i) a dipole source, and ii) a quadrupole source.

19. The method of claim 11 further comprising orienting the acoustic source to reduce an acoustic tool mode.

20. The method of claim 11, wherein the acoustic source is configured to be coupled to a surface of a bottom hole assembly.

* * * * *